(12) United States Patent  
Cosentino et al.

(10) Patent No.: US 9,338,141 B2  
(45) Date of Patent: May 10, 2016

(54) EMBEDDED MODULE SYSTEM WITH ENCRYPTED TOKEN AUTHENTICATION SYSTEM

(71) Applicant: Cardiocom, LLC, Chanhassen, MN (US)

(72) Inventors: Daniel L. Cosentino, Excelsior, MN (US); Christopher T. Abrahamson, Bloomington, MN (US)

(73) Assignee: Cardiocom, LLC, Chanhassen, MN (US)

( * ) Notice: Subject to any disclaimer, the term of this patent is extended or adjusted under 35 U.S.C. 154(b) by 77 days.

(21) Appl. No.: 13/842,614

(22) Filed: Mar. 15, 2013

(65) Prior Publication Data

US 2013/0332730 A1 Dec. 12, 2013

Related U.S. Application Data

(60) Provisional application No. 61/658,702, filed on Jun. 12, 2012.

(51) Int. Cl.
*H04L 9/32* (2006.01)
*H04L 29/06* (2006.01)
*G06F 21/33* (2013.01)
*G06F 21/62* (2013.01)

(52) U.S. Cl.
CPC .......... *H04L 63/0428* (2013.01); *G06F 21/335* (2013.01); *G06F 21/6245* (2013.01); *H04L 63/04* (2013.01); *H04L 63/08* (2013.01); *H04L 63/0807* (2013.01)

(58) Field of Classification Search
CPC ....... H04L 63/0428; H04L 63/08; H04L 9/32; H04L 9/321; H04L 63/0869; H04L 63/10; H04L 9/3213; H04L 9/3273
See application file for complete search history.

(56) References Cited

U.S. PATENT DOCUMENTS

| 7,478,434 | B1 * | 1/2009 | Hinton et al. .................... 726/27 |
| 2009/0138717 | A1 | 5/2009 | Calamera et al. |
| 2010/0137693 | A1 * | 6/2010 | Porras et al. .................. 600/301 |
| 2014/0136847 | A1 * | 5/2014 | Huang ........................... 713/170 |
| 2014/0189356 | A1 * | 7/2014 | Phegade et al. ............... 713/171 |

OTHER PUBLICATIONS

International Search Report and Written Opinion for PCT/US2013/044954 mailed Sep. 20, 2013.

* cited by examiner

*Primary Examiner* — Fikremariam A Yalew

(74) *Attorney, Agent, or Firm* — Michelle H. W. Shen; Girma Wolde-Michael

(57) ABSTRACT

Method and systems for accessing and providing protected content are disclosed herein. An example system includes a client configured to access a third-party application to receive at least one piece of content associated with a first identifier; wherein the client comprises a token generator configured to generate a token requesting the at least one piece of content, the token comprising at least one private encryption key and the first identifier. The system further includes an embedded module system comprising a database of content, the content separated into a plurality of modules, the embedded module system configured to receive the token and decrypt the at least one private encryption key. The embedded module system may further authorize the client by comparing the first identifier with a second identifier stored in the database.

17 Claims, 7 Drawing Sheets

EMBEDDED MODULE SYSTEM WITH
ENCRYPTED TOKEN AUTHENTICATION
SYSTEM

REFERENCE TO CO-PENDING APPLICATIONS

This application claims the benefit of priority of U.S. Provisional Application No. 61/658,702, filed Jun. 12, 2012, and entitled, "EMBEDDED MODULE SYSTEM WITH ENCRYPTED TOKEN AUTHENTICATION SYSTEM," the disclosure of which is incorporated by reference herein in its entirety.

INTRODUCTION

Caregivers frequently wish to review patient medical information to determine a health status of a patient. Accessing physical medical records of such information is tedious, and often requires a caregiver to sift through several files of medical data. Alternatively, information that is electronically stored often requires accessing several different systems, each requiring one or more levels of security authorization which must be manually entered by the caregiver. Upon gaining access to such electronic information, caregivers must often interact with an unfamiliar external system to sift through, often uncategorized, medical records.

EMBEDDED MODULE SYSTEM WITH
ENCRYPTED TOKEN AUTHENTICATION
SYSTEM

In general terms, this disclosure is directed to systems and methods for providing protected content to clients in a network interacting with a client's own application. The protected content is stored on an external server. Upon authentication via a token and/or a private key, a page including the protected content is sent to the client's own application is an embedded user interface.

It should be appreciated that aspects the above-described subject matter may be implemented as a computer-controlled apparatus, a computer process, a computing system, a network of communicating computing systems, or as an article of manufacture such as a computer-readable storage medium. These and various other features will be apparent from a reading of the following Detailed Description and a review of the associated drawings.

This disclosure is provided to introduce a selection of concepts in a simplified form that are further described below in the Detailed Description. This disclosure is not intended to identify key features or essential features of the claimed subject matter, nor is it intended that this be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Reference will now be made to the accompanying drawings, which are not necessarily drawn to scale and wherein.

DETAILED DESCRIPTION

In general, the present disclosure describes systems and methods for providing protected content (e.g., medical information) to client devices via embedded modules in a network interacting with a third-party application on the client device. For example, embodiments described below may enable clients (e.g., hospitals, healthcare professionals, physicians, insurance providers, family members, caregivers, etc.) to utilize a client device (e.g., mobile device, laptop, electronic tablet, or any other computing device) to access content, such as, medical information over a secured network. In particular, the client may use a third-party application on the client device to access the content. The system may utilize an authentication system for a secure transfer of the content. Upon authorization, clients may access the protected content via the third-party application in an embedded user interface.

Figure 1:
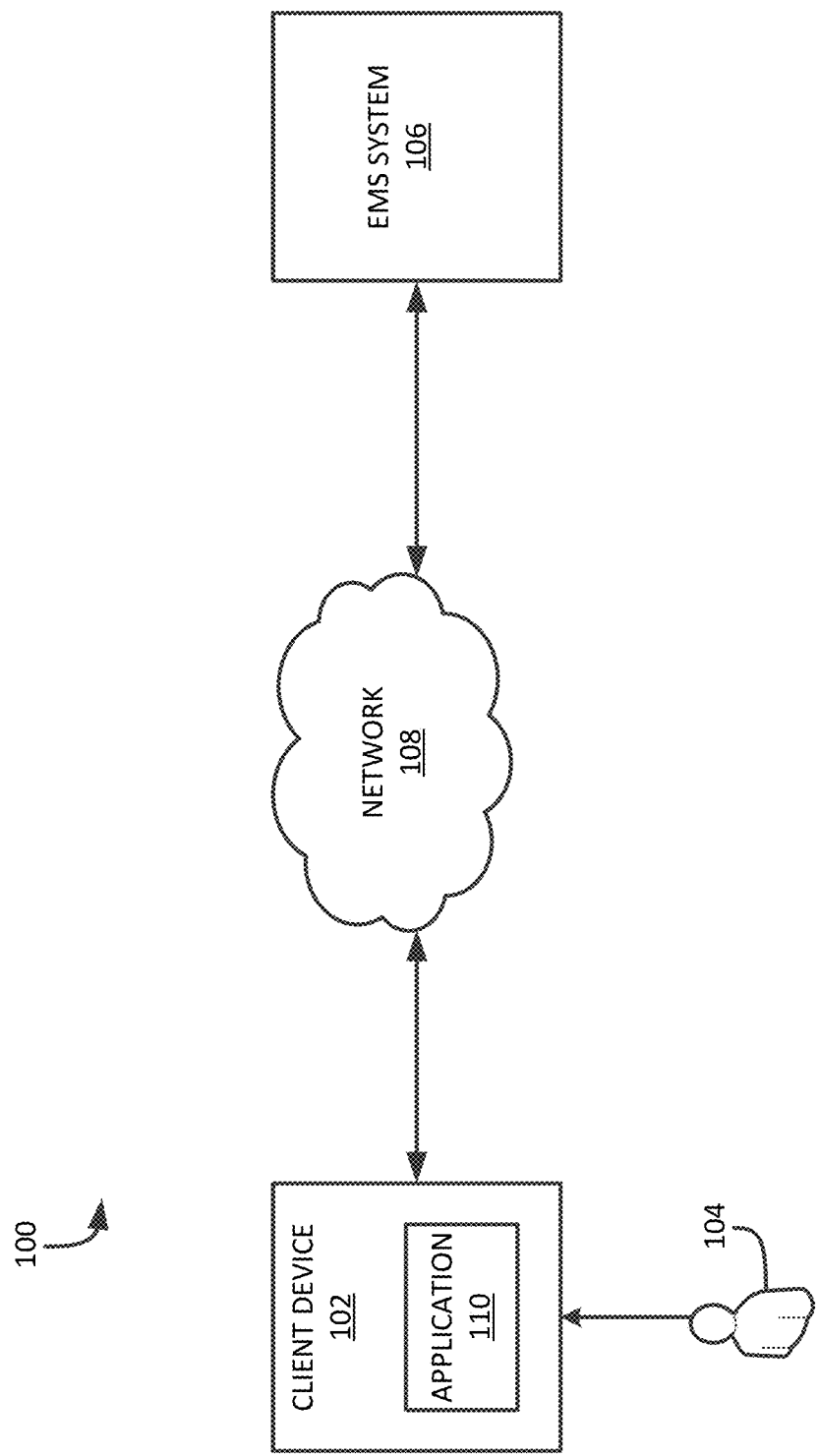
FIG. 1 is a block diagram illustrating an embodiment of system for accessing protected content through embedded modules.

FIG. 1 depicts a system 100 for providing embedded user interfaces having protected content for a third-party application. More specifically, system 100 includes a client device 102, a client 104, an embedded modules system (EMS) 106, and one or more networks 108. The client device 102 includes a third-party application 110.

The client device 102 is capable of directly and/or indirectly communicating with the EMS 106 across the network 108. It is understood that the system 100 may include a plurality of client devices, such as the client device 102. The networks 108 can comprise any of a number of different combinations of one or more different types of networks. For example, the networks 108 can include one or more data private and/or public networks, such as a local area network (LAN), a metropolitan area network (MAN), and/or a wide area network (WAN) (e.g., Internet), can include one or more wireline and/or wireless voice networks including a wireline network, such as a public-switched telephone network (PSTN), and/or wireless networks. For purposes of illustration and simplicity, however, as described below, the network comprises the Internet (i.e., WAN) unless otherwise noted.

The client device 102 and the EMS 106, may comprise any one or more of a number of devices capable of operating as described below. In this regard, one or more of the client device 102 and the EMS 106 can comprise, include or be embodied in one or more processing elements, such as one or more of a laptop computer, desktop computer, server computer or the like. Additionally or alternatively, one or more of the client device 102 and the EMS 106 can comprise, include or be embodied in one or more portable electronic devices, such as one or more of a mobile computing device such as a smart telephone (e.g., iPhone), portable digital assistant (PDA), electronic tablet, pager, tablet computer, laptop computer, or the like. For example, the client device 102 and the EMS 106 can each comprise a processing element capable of communicating with one another across the Internet (i.e., the networks 108). It should be understood, however, that one or more of the client device 102 and the EMS 106 can comprise or otherwise be associated with a user carrying out one or more of the functions of the respective entity. For example, the client 104 is a user that can utilize the client device 102 to access the EMS 106.

In the example of FIG. 1, the EMS 106 is generally capable of providing one or more pieces of protected content to the client device 102 through embedded module interfaces. The client 104 can then read, review, and/or interact with the content through interfaces via the third-party application 110 (e.g., web browser). For example, in some embodiments, the client 104 utilizes the client device 102 to access the third-party application 110. The third-party application 110 can connect to the EMS 106 via the one or more networks 108. Upon authorization of the client 104 and/or the client device 102, the EMS 106 sends the protected content to the client device 102, where it is hosted by the third-party application 110 in an embedded user interface. Thus, the embedded module functionality is hosted in the third-party application 110, but all logic, display mechanism, and data sources contained and used within the embedded user interface is under the control of the EMS 106. Thus, the client 104 may access the data stored within the EMS 106 through simple and secure interfaces on the third-party application 110, while the EMS 106 maintains the look, functionality, and data sources of the embedded user interface. Examples of the third-party application 110 include, but are not limited to, browsers, personal health care management systems, and the like.

The EMS 106 may categorize its data into different modules. For example, in some embodiments the EMS 106 organizes modules based on a patient or a grouping of patients. In other embodiments, modules are organized based on the type of data in the module. Types of data may include, vital signs, graphs, grids, patient reports, patient summaries, etc. Upon connected to the EMS 106 via the networks 108, the client 104 may be able to request one or modules of data to view. Alternatively or additionally, the client 104 may be able to request individual pieces of content not organized into modules by the EMS 106. For purposes of brevity, the term "protected information" will be used to describe modules and/or pieces of content stored in the EMS 106.

The EMS 106 is capable of providing one or more read-only modules and/or pieces of content to the client device 102. Examples of read-only modules and/or pieces of content can include viewable vital sign graphs and/or grids, patient reports, patient data and the like. Some of the vital signs include, but are not limited to, weight, blood pressure, glucose, peak flow, O2 saturation, and/or heart rate, all of which may be selectively viewable in graph, grid, table, and/or list format. In some examples, users can request a module having a summary of one or more vital sign measurements for a patient or a group of patients in a single grid and/or graph. This may enable a client 104 to make visual comparisons of grid and/or graph shape to determine a health status of the one or more patients. In some embodiments, the client 104 may specify to the EMS 106 how to display and/or filter protected information, such as by date range, form of visual representation, type of data, etc. Some protected information also comes equipped with a 1-click PDF reporting module. The PDF may include a mixture of any patient or several patients' data as described above and/or an exception report. Examples of exception reports include reports notifying a caregiver of a patient's possible need for assistance, when, for example, the patient's wellness parameters (vital signs, mental health status, etc.) fall outside a predetermined acceptable value. In this way, the EMS 106 may publish any variety of data to the client device 102, in particular the third-party application 110, in a PDF format. Thus, if the client 104 requests a particular report that is not part of a predetermined module, the EMS 106 can still send a PDF through the system with the requested data. The client may access the newly created report through an existed module that is edited for the client or through a newly created module that contains the PDF. It is understood that exception reports may also be presented via a standard embedded module that is not transmitted in a PDF-format.

The EMS 106 is further capable of providing one or more interactive modules and/or pieces of content to the client device 102. Examples of interactive embedded modules and/or or pieces of content include interfaces allowing the client device 102 to add a system user in the EMS 106, create patient accounts in the EMS 106, assign telehealth devices to associated patient records in the EMS 106, create new user accounts in the EMS 106, modify and/or add patient data to the EMS 106, and the like. In some embodiments, access to interactive protected information requires greater levels of authentication versus access to read-only protected information.

The protected information is presented to the user via the third-party application 110. In some embodiments, the protected information includes several user options to allow for the embedded user interface by the third-party application 110 to match the look and feel of the client device 102 general user interfaces in the third-party application 110.

Figure 2:
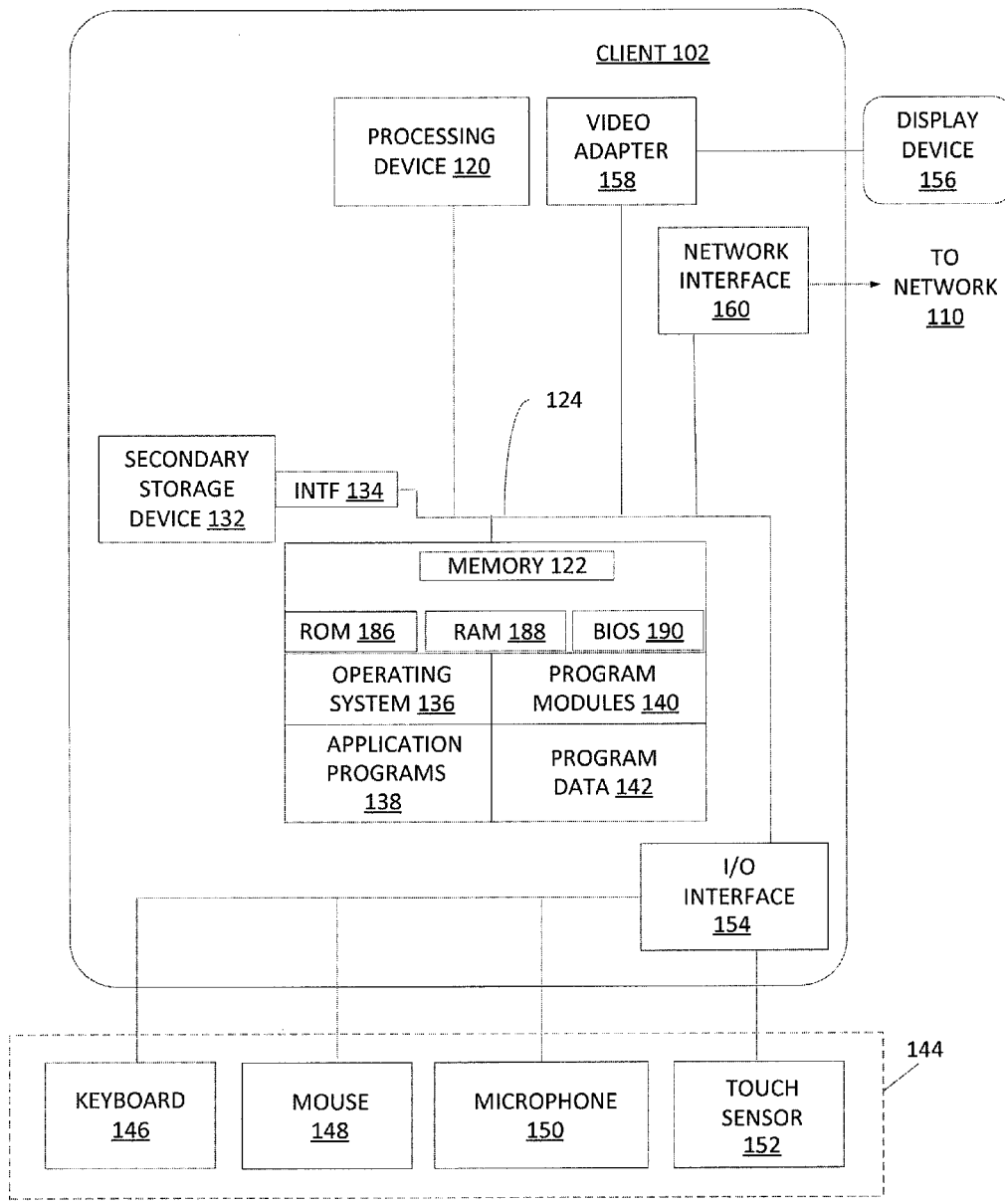
FIG. 2 illustrates an exemplary architecture of a computing device that can be used to implement aspects of the present disclosure.

FIG. 2 illustrates an exemplary architecture of a computing device that can be used to implement aspects of the present disclosure, including the client device 102, EMS 106 or any other additional computing devices that may be included in the system 100. For simplicity, the exemplary architecture will be referred to herein as the client device 102, but it is understood that the below description of FIG. 2 can further relate to the client device 102, the EMS 106, and/or any other additional computing device added to the system 100. One or more computing devices, such as the type illustrated in FIG. 2, are used to execute the operating system, application programs, and software modules (including the software engines) described herein.

The client device 102 includes, in some embodiments, at least one processing device 120, such as a central processing unit (CPU). A variety of processing devices are available from a variety of manufacturers, for example, Intel or Advanced Micro Devices. In this example, the EMS 106 also includes a system memory 122, and a system bus 124 that couples various system components including the system memory 122 to the processing device 120. The system bus 124 is one of any number of types of bus structures including a memory bus, or memory controller; a peripheral bus; and a local bus using any of a variety of bus architectures.

Examples of computing devices suitable for the client device 102 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within the client device 102, such as during start up, is typically stored in the read only memory 126.

The client device 102 also includes a secondary storage device 132 in some embodiments, such as a hard disk drive, for storing digital data. The secondary storage device 132 is connected to the system bus 124 by a secondary storage interface 134. The secondary storage devices and their associated computer readable media provide nonvolatile storage of computer readable instructions (including application programs and program modules), data structures, and other data for the client device 102.

Although the exemplary environment described herein employs a hard disk drive as a secondary storage device, other types of computer readable storage media are used in other embodiments. Examples of these other types of computer readable storage media include magnetic cassettes, flash memory cards, digital video disks, compact disc read only memories, digital versatile disk read only memories, random access memories, or read only memories. Some embodiments include non-transitory media.

A number of program modules can be stored in secondary storage device 132 or memory 122, including an operating system 136, one or more application programs 138, other program modules 140, and program data 142. The database 108 may be stored at any location in the memory 122, such as the program data 142, or at the secondary storage device 132.

In some embodiments, the client device 102 includes input devices to enable the administrators 106, other users, and/or computing devices to provide inputs to the client device 102. Examples of input devices 144 include a keyboard 146, pointer input device 148, microphone 150, and touch sensitive display 152. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices and interface 154 is possible as well, and includes infrared, BLUETOOTH® wireless technology, 802.11a/b/g/n, cellular or other radio frequency communication systems in some possible embodiments.

In this example embodiment, a touch sensitive display device 156 is also connected to the system bus 124 via an interface, such as a video adapter 158. The touch sensitive display device 156 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 156, the client device 102 can include various other peripheral devices (not shown), such as speakers or a printer.

When used in a local area networking environment or a wide area networking environment (such as the Internet), the client device 102 is typically connected to the network through a network interface, such as a wireless network interface 160. Other possible embodiments use other communication devices. For example, some embodiments of the client device 102 include an Ethernet network interface, or a modem for communicating across the network.

The client device 102 typically includes at least some form of computer-readable media. Computer readable media includes any available media that can be accessed by the client device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the client device 102.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 3:
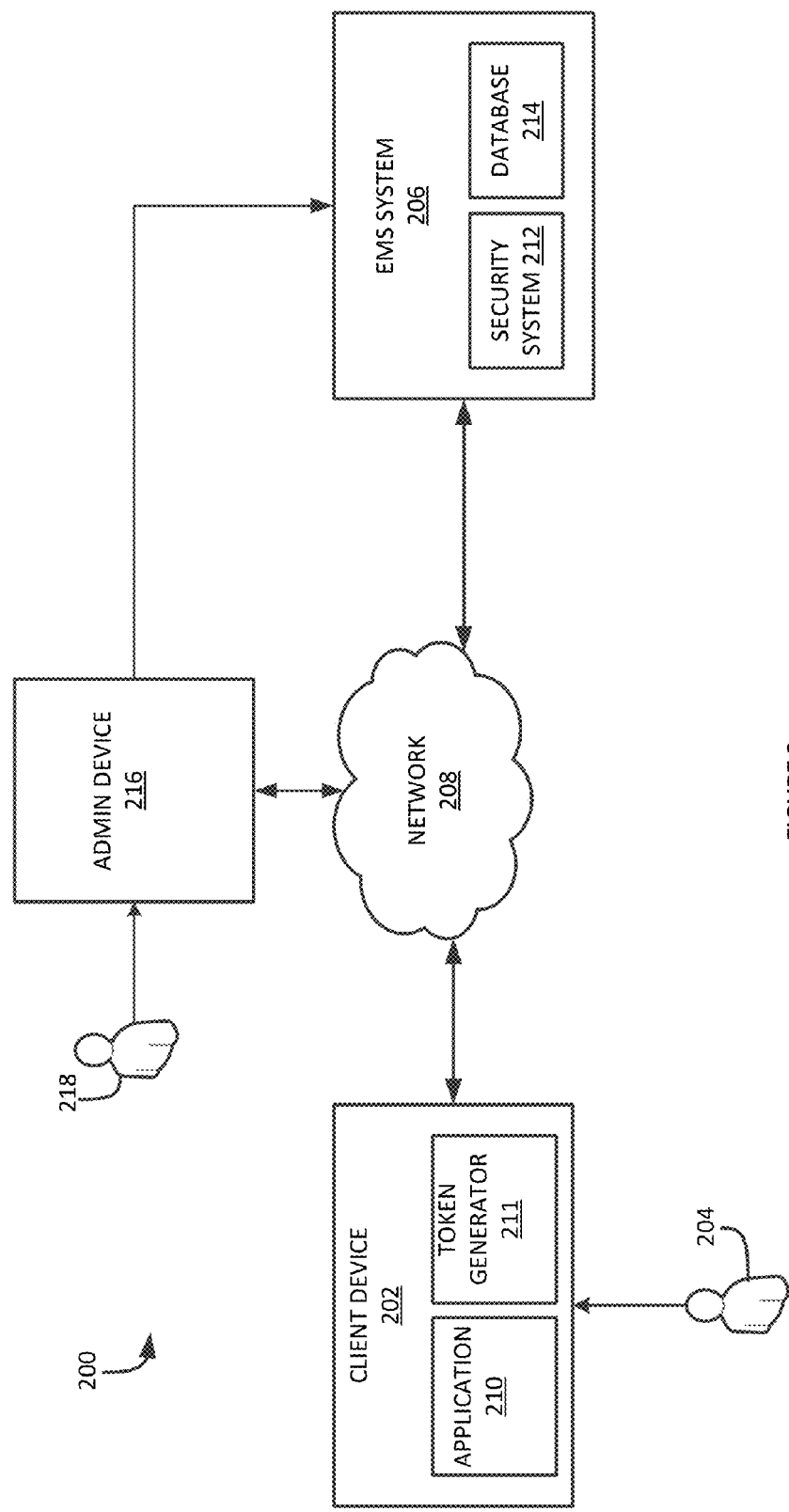
FIG. 3 is a block diagram illustrating a system of accessing protected content through embedded modules, in accordance with a second embodiment.

FIG. 3 depicts a system 200 for providing protected information third-party application 210 to a client device. In particular, the system 200 includes a client device 202, a client 204, an EMS 206, one or more networks 208, an administrator device 216, and an administrator user 218 EMS 206. client 204 The client device 202 includes a client application 210 and a token generator 211. The EMS 206 includes an EMS security system 212 and a database 214. In general, the system 200 is an alternate embodiment of the system 100, shown in FIG. 1.

The system 200 functions in substantially the same way as the system 100. In particular, the client 204 accesses protected information stored in the EMS 206, particularly in the database 214, via the third-party application 210. In some embodiments, the client 204 operates the client device 202 to access the third-party application 210. Thereafter, the client 204 utilizes the third-party application 210 to connect transmit a request for protected information to the EMS 206. The client 204 and/or the client device 202 may be authenticated via various method of authentication, described below. Upon authentication, the EMS 206 sends the requested protected information from the database 214 over a secured connection (e.g., SSL connection) to the third-party application 210, where the client 204 may view and/or interact with the protected information through a user interface. client 204 third-party application 210 third-party application 210 EMS 206 EMS 206 client 204 third-party application 210 EMS 206 third-party application 210 client 204

The administrator device 216 and the administrator user 218 may be included in the system 200. In some embodiments, the administrator device 216 is a computing device as described above in FIG. 2 with respect to the client device 102 and the EMS 106. The administrator user 218 accesses the administrator device 216 to configure settings and monitor activities related to the EMS 206. The administrator device 216 may control aspects of technical support and enhancements related to the EMS 206. The administrator device 216 may further maintain and update records of all authorized users and the protected information that said users are authorized to access. Thus, in some embodiments, the administrator device 216 may configured the settings of the security system 212. In addition, the client 204 may communicate with the administrator user 218 to trouble shoot various aspects of the connectivity between the client device 202 and the EMS 206, and other issues surrounding the use of the EMS 206 to access protected information.

The administrator device 216 in conjunction with the administrator user 218 may remotely maintain future support and enhancements to the EMS 206 without any actions on the part of the client device 202 and/or the client 204. Thus, the system 200 simplifies the daily work flow for clients by removing the need for client device 202 to log into multiple systems to manage varying patient data. By enabling the client device 202 to access protected information via the client's own applications, the client device 202 need not manage multiple applications. Instead, the client device 202 may request particular protected information to be hosted in a single third-party application, such as the third-party application 210.

The EMS 206 utilizes an encrypted token authentication system. In some embodiments, this may require an initial setup on the client device 202. An initial setup may include receiving files and/or data packages from the EMS 206. For example, an initial setup may include receiving a compressed package from the EMS 206 at the client device 202. The compressed package may include at least one of a configuration file, a dynamic-linked library (e.g., a file with a ".dll" extension), and a private key. The dynamic-linked library may include a token generator, such as the token generator 211, for generating tokens to provide to the EMS 106, and an application programming index including rules to call the token generator. The private key may be configurable so that either the client device 202 or the EMS 206 may alter the key for added security within a certain number of days. In some embodiments, the initial setup may include defining a container or multiple containers for implementation of the protecting information in the third-party application 210. Some examples of the containers include an IFRAME, or any other container type that can display HTML as viewed in a web browser.

In use, the client device 202 may call the token generator 211 to generate a unique, secure, and encrypted token for that specific client device 202 and/or client 204. The token includes encrypted items that may vary with each instance of token creation. The client device 202 and/or the third-party application 210 request pages containing protected information from the EMS 206. In some embodiments, such a request may include the generated token and other authentication information. The EMS 206 uses the token and the other authentication information to verify that the client device 202 and/or the client 204 should have access to the requested protected information. If authorized, the EMS 206 sends a page to the client device 202 which is rendered in the third-party application 210. The page may be a read-only or interactive user interface that is embedded in the third-party application 210.

The encrypted items embodied in the generated token vary for each token, but may include token lifetime information, the type of module being requested, an identifier of the client 204 requesting module access, identifiers of a patient whose data is being requested, parameters relevant to the module being requested, flags on how to display and/or filter the data, information relevant to how the EMS 206 should operate, and the like. If the EMS security system 212 can decrypt the token information, the requested module will be returned based on the remaining token items that were included. If, however, the EMS security system 212 cannot decrypt the token information, the requested module will not be returned and access will be denied.

In some embodiments, the generated token includes a user identifier. The EMS security system 212 compares this user identifier with user records stored in the EMS database 214. To authenticate the user, the EMS security system 212 determines whether the identifier is associated with a user record. More specifically, the associated user record in the EMS database 214 may have a linked, unique identifier that is required for the third-party application 210 to send to the EMS 206 to properly identify the user.

Similarly, when requesting protected information that is patient specific, the generated token may include a patient identifier. The patient identifier sent in the token must match an associated patient record that is stored in the EMS database 214. The EMS security system 212 can also apply domain requestor validation. For example, when a request for a module is sent, the EMS security system 212 may check the origination of the request to ensure that it was sent from a valid network domain, IP address, IP address range, or the like. In such embodiments, only validated domains and IP addresses may access the requested modules.

Figure 4:
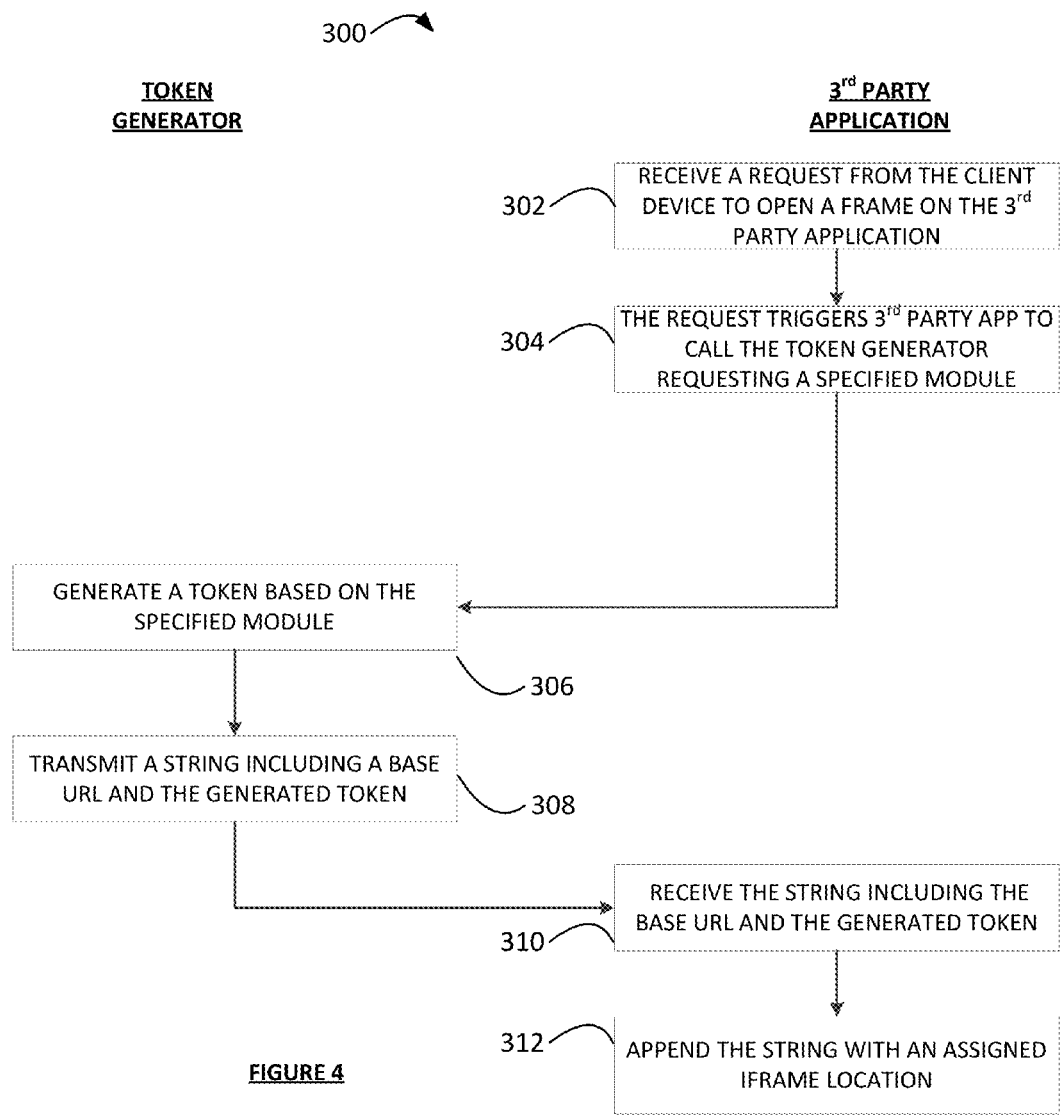
FIG. 4 is a flow diagram showing an embodiment of a method for generating tokens for accessing protected content through embedded modules.

FIG. 4 is a flow diagram showing aspects of an embodiment of a method for generating tokens for accessing protected content through embedded modules. The flow diagram illustrates the operations alternately performed by the token generator and the third-party application showing aspects of a method 300 of communications between a third-party application (e.g., third-party application 210) with a token generator is shown. In general, the method 300 describes an example of token generation. Operations of the method 300 may be implemented by the components and structure described above with reference to FIGS. 1-3.

The method 300 begins at operation 302 in which the third-party application receives a request from a client device to open a frame on the third-party application. In one example, a client 204 utilizes input devices to indicate to the client device 202 to initiate communication with the EMS 206. The client device 202 receives the input from the client 204 and sends a request to the third-party application 210 to open a frame on the third-party application 210.

At operation 304, the request is accepted at the third-party application 210. The request triggers the third-party application 210 to call the token generator 211. The third-party application calls the token generator 211 and includes a specified embedded module or multiple modules requested by the client device 202. In some instances, the number of embedded modules that may be requested varies based on the client device, user, financial plan associated with the client, or the like. For example, the client 204 may be required to pay higher fees to the administrators of the EMS to access multiple embedded modules simultaneously.

In some embodiments, the token generator is locally stored on the client device 202 when the client device 202 receives an initial compressed package during installation, described above. The compressed package may include a configuration file, a dynamic linked library, and/or a shared private key. The dynamic linked library may include the token generator 211 which knows a local location of the configuration file. When the token generator receives the call from the third-party server, may utilize this local location during token generation.

At operation 306, the token generator 211 receives the call for token creation by the third-party application and generates a token based on the specified module. For example, upon receiving the request, the token generator 211 may use the local location of the configuration file to search for and access the configuration file. In embodiments where the token generator 211 does not have a local location of the configuration file, the token generator 211 may be equipped with a default local location where the token generator 211 may search for the file.

Upon retrieving the configuration file, the token generator 211 may retrieve various pieces of information stored in the file. For example, the token generator 211 may access a client identifier, patient identifier, parameters relevant to the module being requested, flags on how to display and/or filter the data in the specified embedded module, information relevant to how the EMS 206 should operate, token lifetime information, a base URL pointing at the location the EMS 206, a session time period, the shared private key, and the like. In yet other embodiments, some or all of the information may be in the call itself sent during operation 304. The token generator 211 then generates a token utilizing some or all of the retrieved information. In some embodiments, the generated token 211 will be appended to a string including the base URL. Thus, in some examples, a string including the base URL and the generated token having some or all of the above information is created by the token generator 211. It is understood that in other embodiments, some of the information may not be included in the string and/or token.

At operation 308, the string including the base URL and the generated token is transmitted back to the third-party application 210. At operation 310, the string is received at the third-party application 210 for further use. In some embodiments, at operation 312, the third-party application 210 further appends the string with an assigned IFRAME location or other location where the requested embedded module(s) will be rendered.

Figure 5:
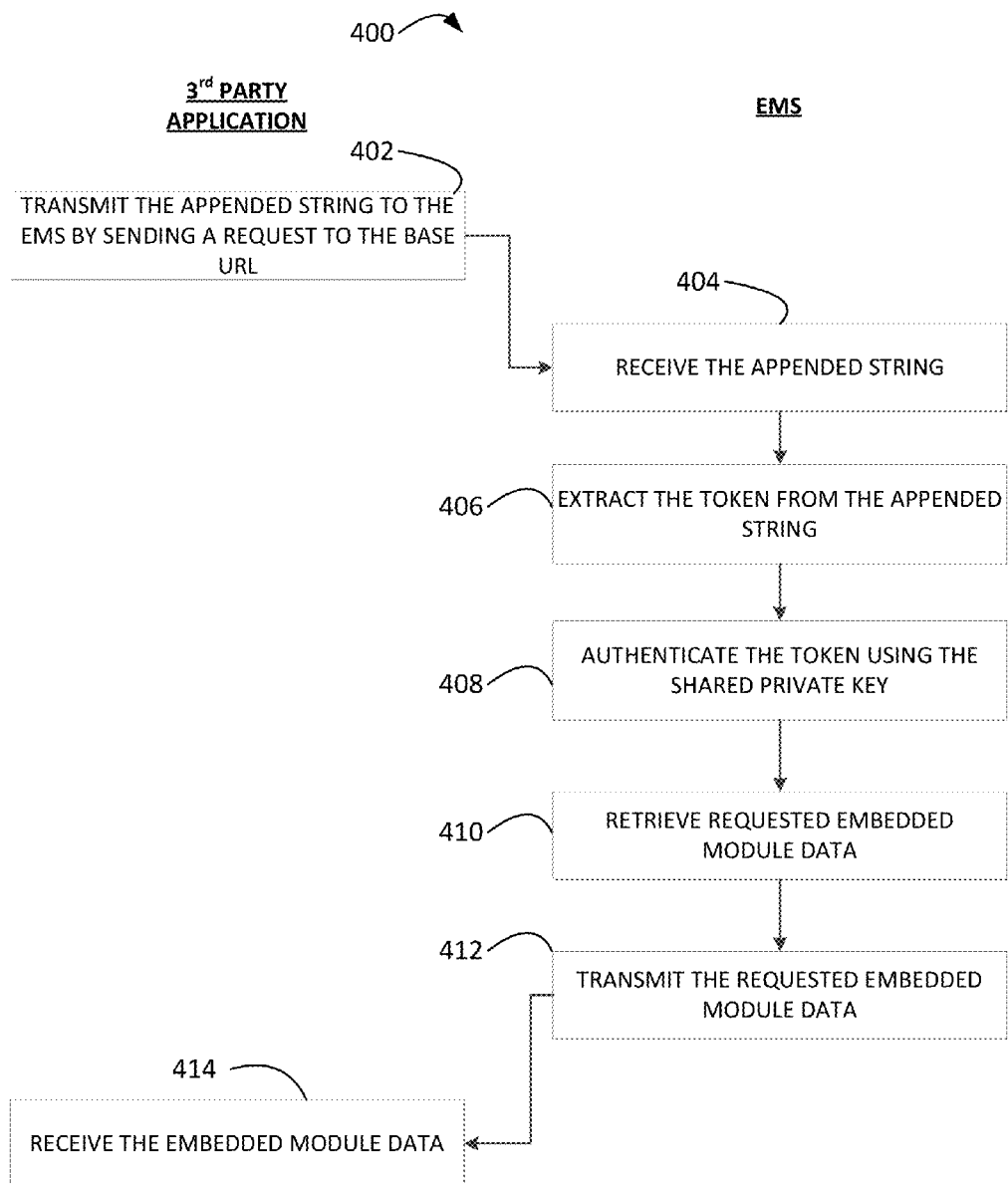
FIG. 5 is a flow diagram showing aspects of an embodiment of a method for accessing protected content through embedded modules.

FIG. 5 is a flow diagram showing aspects of an embodiment of a method for accessing protected content through embedded modules. The flow diagram illustrates the operations alternately performed by the third-party application and the EMS showing aspects of a method 400 of communications between a third-party application (e.g., third-party application 210) and an EMS (e.g., the EMS 206). In general, the method 400 includes an example method that occurs after the operation 312 in FIG. 4. Operations of the method 400 may be implemented by the components and structure described above with reference to FIGS. 1-3.

At operation 402, the third-party application 210 transmits the appended string to the EMS 206 by sending a request to the base URL. As stated above, in some embodiments, the third-party application 210 may transmit the appended string without the base URL but with the generated token and the appended IFRAME location. The request indicates to the EMS 206 the specified module being requested by the client device 202. At operation 404, the EMS 206 receives the appended string.

At operation 406, the EMS 206 extracts the generated token from the received string. After retrieving the generated token, the EMS 206 may further extract any information stored within the generated token, such as, for example, a client identifier, patient identifier, user identifier, parameters relevant to the module being requested, flags on how to display and/or filter the data in the specified embedded module, information relevant to how the EMS 206 should operate, token lifetime information, a session time period, the shared private key, and/or the like.

After operation 406, the method 400 moves to operation 408, where the EMS 206 authenticates the token using the private key extracted from the received string. During this process, the EMS 206 may ensure that several other layers of authentication are completed. For example, the EMS 206 may ensure that any patient, client, and/or user identifiers are included in a list of allowable patient, client, and/or user lists. If, for example, a patient, client, and/or user identifier embedded in the generated token does not match the stored list in the EMS 206, the EMS 206 may deny access to the requested module. In addition, if more than one identifier is sent to the EMS 206, but only one identifier matches, the EMS 206 may not grant access.

In other embodiments, specific types of identifiers may be necessary to access particular embedded modules. For example, certain modules may require a client or user to have paid a higher subscription fee to access the module. If so, a user or client identifier may be required to match a list of allowable users and/or clients prior to receiving access to the module. If that type of identifier is not transmitted to the EMS 206, or if the identifier does not match the stored list in the EMS 206, the EMS 206 may deny access to the particular embedded module. In some embodiments, only one embedded module may be requested, and therefore, any additional requests may be denied. In yet further embodiments, interactive embedded modules may require added security, such as, for example, multiple identifiers, due to the ability to manipulate data within the embedded module.

After operation 408, the method flow may move to operation 410, where the EMS 206 retrieves the requested embedded module data from the database 214. The generated token includes information, such as a code, identifier, name, or the like, of a specific embedded module or modules that is requested by the client 204 and/or client device 202. A page including the retrieved embedded module data is then sent to the third-party application 210 at operation 412. If, however, after operation 408, the generated token does not meet the requirements for authentication, an error message and/or authentication denial message is sent back to the third-party server.

At operation 414, the third-party application 210 receives the page including the request module. The data is rendered at the IFRAME location specified by the third-party application 210. The embedded module data is rendered within the third-party application 210 so that the user can then read, review, and/or interact with the content through interfaces via the third-party application.

Figure 6:
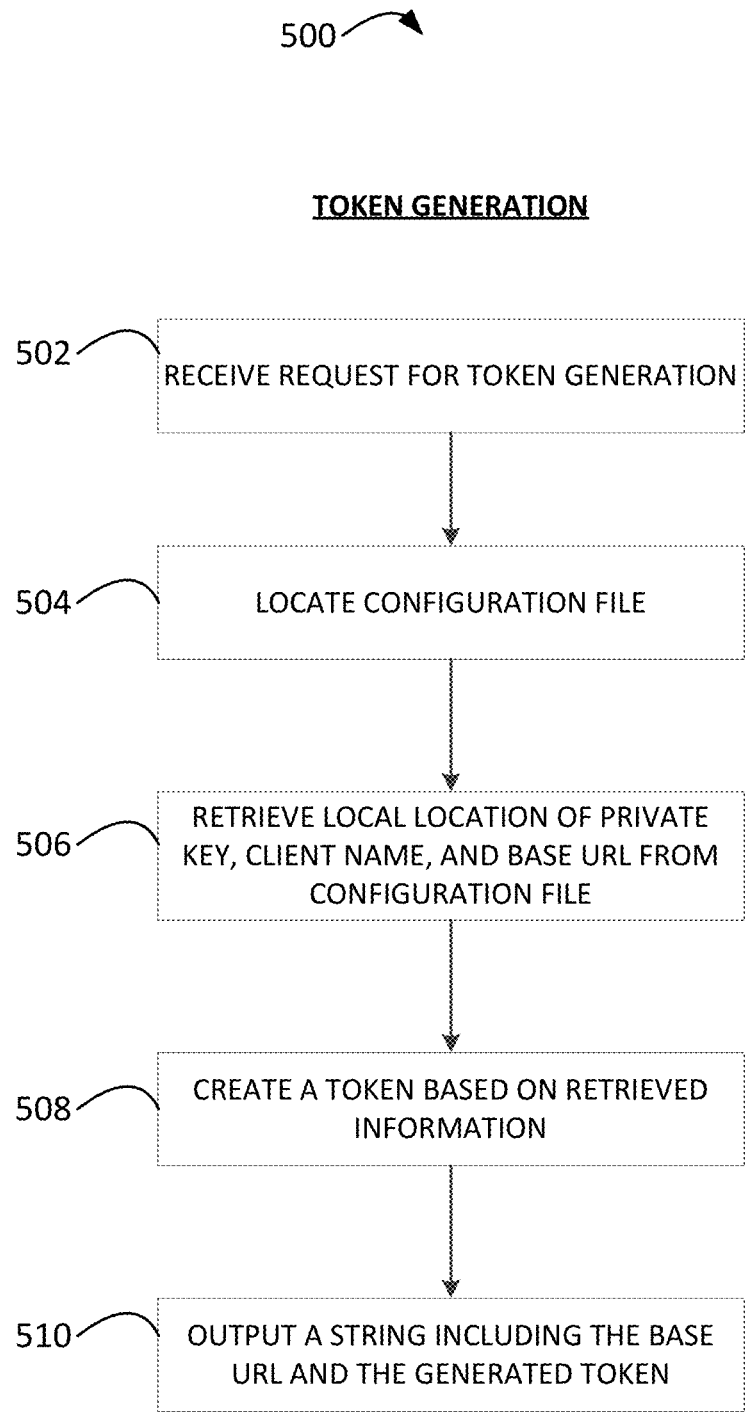
FIG. 6 is a flow diagram showing aspects of an embodiment of a method for token generation.

FIG. 6 is a flow diagram showing aspects of an embodiment of a method 500 for token generation. In general, the method 500 is an example method of token creation performed by the token generator. Operations of the method 500 may be implemented by the components and structure described above with reference to FIGS. 1-3.

The method 500 begins at operation 502 where the token generator receives a request for token generation, in some examples, by the third-party application 210. At operation 504, the token generator locates the configuration file after receiving the request for token generation. For instance, upon receiving the request, the token generator may use the local location of the configuration file to search for and access the configuration file. In embodiments where the token generator does not have a local location of the configuration file, or if file is not located at the specified local location, the token generator may be equipped with a default local location where the token generator may search for the file.

Upon retrieving the configuration file, the token generator may retrieve various pieces of information stored in the file, such as, for example, a private key, client name, and base URL pointing to the location of the EMS 206. In other embodiments, the token generator may alternatively or additionally access a client identifier/name, patient identifier/name, parameters relevant to the module being requested, flags on how to display and/or filter the data in the specified embedded module, information relevant to how the EMS 206 should operate, token lifetime information, a session time period, and the like.

At operation 506, the token generator then generates a token utilizing some or all of the retrieved information. In some embodiments, the generated token will be appended to a string including the base URL. Thus, in some examples, a string including the base URL and the generated token having some or all of the above information is created by the token generator. It is understood that in other embodiments, some of the information may not be included in the string and/or token.

At operation 508, the token generator outputs the string which includes the base URL and the generated token. In some embodiments, the string is then sent to the third-party application 210 where the string is either utilized as is or appended with further information, such as an IFRAME location.

Figure 7:
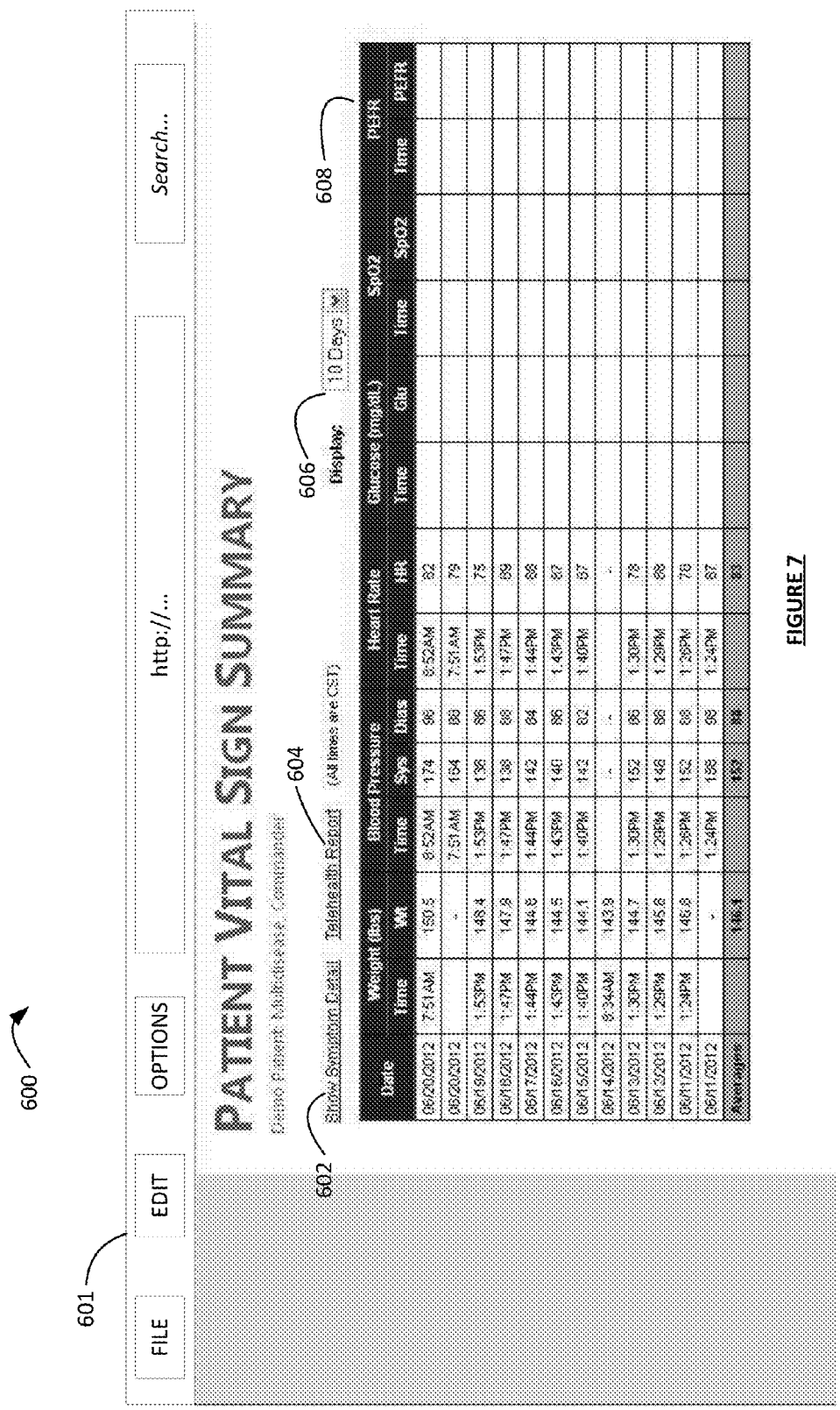
FIG. 7 is an embodiment of a page displayed in an IFRAME by a client device.

FIG. 7 shows an exemplary user interface including embedded module data as presented on a third-party application. In particular, the user interface 600 includes a toolbar 601, a first link 602, a second link 604, a display filter 606, and a data grid 608. In general, the user interface 600 depicts exemplary data in one embodiment of an embedded module. The user interface 600 is one example of how a requested embedded module is presented within the third-party application (e.g., third-party application 210).

The exemplary user interface 600 includes embedded module within the third-party application. In particular, the toolbar 601 is an exemplary toolbar associated with the third-party application. Thus, the embedded module is presented within the environment of the third-party application, such that it appears to be a part of the third-party application.

The embedded module includes the first and second links 602, 604. The links redirect the user to details on the patient's symptoms and/or a full telehealth report on the patient's health status. If clicked, the links will not redirect the user to a screen outside of the third-party application, but instead, will generate a new screen within the embedded module. In this way, all interactions with the embedded module are contained within the single frame of the third-party application. In some embodiments, the first and second links 602, 604 may not be present in the embedded module. In other embodiments, additional or alternate links relating to further information about the patient, user, system, or the like, will be included in the embedded module data.

The display filter 606 allows the user to interact with the embedded module data by filtering the number of symptom information that is viewable on the grid 600. In other embodiments, additional or alternate filters will be included in the grid, such as, for example, filters of date, type of vital sign, type of symptom, time, patient name, physician/nurse name, or the like.

The data grid 608 generally depicts the vital sign measurements of a particular patient at different times on different dates. In other embodiments, the vital signs of multiple patients may be viewable on the grid. In addition, other alternate vital signs and/or combinations of vital signs may be viewable on the grid, for example, weight, blood pressure, glucose, peak flow, $O_2$ saturation, heart rate, respiratory parameters, dialysis parameters, and the like.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

What is claimed is:

1. A system for providing content, the system comprising:
a client device configured to access a third-party application to receive at least one piece of content, wherein the client device comprises a token generator configured to generate an encrypted token requesting the at least one piece of content, the token comprising a first identifier and at least one additional encrypted item; and
an embedded module system comprising a database of content, the content separated into a plurality of modules, the embedded module system configured to receive the encrypted token and to extract the first identifier and the at least one additional encrypted item, wherein the embedded module system matches the first identifier to a record stored in the database and transfers the at least one piece of content based on the first identifier and on the at least one additional encrypted item to the client device, wherein the at least one piece of content is received through at least one embedded user interface on the third-party application,
wherein the third-party application is configured to:
receive a string from the token generator, the string including a base URL and a generated token;
append the string with an assigned container location;
send a request for the specified content to the base URL, the request including the appended string.

2. The system of claim 1, wherein the first identifier is one of: a patient identifier, a client identifier, and a user identifier.

3. The system of claim 1, wherein the at least one additional encrypted item comprises a patient identifier, a client identifier, a user identifier, token lifetime information, the type of module being requested, a parameter relevant to the module being requested, or a flag on how to display or filter the data.

4. The system of claim 1, wherein the token comprises a module identifier and token lifetime information, wherein the module identifier identifies the at least one piece of content being requested, and wherein the token lifetime information includes a time period of the session.

5. The system of claim 1, wherein the at least one piece of content is interactive.

6. The system of claim 1, wherein the token generator is sent to the client from the embedded module system prior to token generation.

7. The system of claim 1, wherein the database includes at least one of: a list of authorized users, a list of authorized patients, and a list of authorized clients.

8. The system of claim 1, wherein the at least one piece of content includes patient vital sign information, wherein the patient vital sign information includes at least one of weight measurements, blood pressure measurements, glucose measurements, peak flow measurements, $O_2$ saturation measurements, and heart rate measurements.

9. A method of requesting embedded module content from an embedded module server comprising:

receiving a first request from a client device to open a frame on a third-party application;

sending a second request to a token generator to generate a token, wherein the second request includes a module identifier;

receiving a string from the token generator, the string including a base URL and a generated token;

appending the string with an assigned container location;

sending a third request for the embedded module content to the base URL, the third request including the appended string; and receiving the embedded module content at the third-party application.

10. The method of claim 9, wherein the generated token includes at least one of: a patient identifier, a client identifier, a user identifier, token lifetime information, the type of module being requested, a parameter relevant to the module being requested, or a flag on how to display or filter the data.

11. The method of claim 9, wherein sending the second request to the token generator causes the token generator to:
locate a configuration file on the client device;
retrieve information from the configuration file, the information including the base URL;
create the generated token based on the retrieved information; and
output the string.

12. The method of claim 9, wherein sending the third request for the embedded module content to the base URL causes the embedded module server to:
receive the appended string;
extract the generated token from the appended string;
authenticate the token;
retrieve the embedded module content that is requested; and
transmit the embedded module content to the third-party application.

13. The method of claim 12, wherein when the requested embedded module content is interactive, authenticating the token comprises more than one level of authentication.

14. The method of claim 9, wherein the token generator is pre-stored in the client device prior to sending the first request.

15. A system for providing content, the system comprising:
a client device having a pre-stored token generator, the client device arranged and configured to access a third-party application stored on the client device, the third-party application further configured to:
receive a request from the client device to request specified content from an embedded module server;
send a second request to a token generator to generate a token, wherein the request includes a module identifier;
receive a string from the token generator, the string including a base URL and a generated token;
append the string with an assigned container location;
send a third request for the specified content to the base URL, the third request including the appended string, and
the embedded module server in communication with the third-party application, the embedded module server arranged and configured to:
receive the appended string;
extract the generated token from the appended string;
authenticate the generated token;
retrieve the specified content that is requested; and
transmit the specified content to the third-party application.

16. The system of claim 15, wherein the embedded module transmits the specified content to the third-party application in a PDF format.

17. The system of claim 16, wherein the PDF format includes an exception report.

* * * * *